United States Patent [19]

Sasaki et al.

[11] Patent Number: 4,494,825
[45] Date of Patent: Jan. 22, 1985

[54] FILL PORT SEAL WITH FIRST AND SECOND PHOTOSENSITIZERS

[75] Inventors: Ken Sasaki; Shigeru Matsuyama; Masaharu Koyama, all of Mobara; Kazuyoshi Ichihara, Chiba, all of Japan

[73] Assignee: Hitachi, Ltd., Tokyo, Japan

[21] Appl. No.: 354,183

[22] Filed: Mar. 3, 1982

[30] Foreign Application Priority Data

Mar. 4, 1981 [JP] Japan ................................. 56-29864

[51] Int. Cl.³ .......................... G02F 1/133; C08F 8/00
[52] U.S. Cl. ................................. 350/343; 204/159.15
[58] Field of Search ............................. 350/343, 342; 204/159.15, 159.16, 159.17, 159.23; 525/7.1

[56] References Cited

U.S. PATENT DOCUMENTS 3,840,448 10/1974 Osborn et al. ............. 204/159.16 X
4,113,592  9/1978 Rybny et al. ................... 204/159.16

FOREIGN PATENT DOCUMENTS 153651 12/1979 Japan ................................... 350/343

Primary Examiner—John K. Corbin
Assistant Examiner—David Lewis
Attorney, Agent, or Firm—Antonelli, Terry & Wands

[57] ABSTRACT

A liquid crystal display device, wherein a fill port for inserting a liquid crystal composition thereinto is sealed by using a photo-setting resin composition comprising an acrylic or methacrylic type resin as a major resin component and two or more photosensitizers different in quality, is excellent in reliability and the sealed portion of the fill port can sufficiently and uniformly be cured both in surface and inner portions by irradiation of light in a short time.

10 Claims, 2 Drawing Figures

FILL PORT SEAL WITH FIRST AND SECOND PHOTOSENSITIZERS

BACKGROUND OF THE INVENTION

This invention relates to a liquid crystal display device, more particularly to a liquid crystal display device wherein a fill port for inserting a liquid crystal composition is sealed by using a special photo-setting resin composition.

As sealing mediums for sealing the fill port, there have been proposed photo-setting resins such as acrylic or methacrylic resins because of easiness in working operations and lesser deterioration of liquid crystal materials during the sealing operation of the fill port. Curing of such photo-setting resins is greatly influenced by the kinds and amounts of photosensitizers used together with them. For example, if there is used as the sealing medium for the fill port a photosensitive resin composition which requires a longer reaction time for curing, since the contact time with the liquid crystal materials under uncured conditions becomes longer, ionic substances in the resin migrate to and contaminate the liquid crystal materials, which results in lowering operation properties of the resulting liquid crystal display device. Further, since liquid crystal materials are easily deteriorated by exposure to ultraviolet light, longer reaction time makes the deterioration of liquid crystal materials greater. On the other hand, if a large amount of photosensitizer is used in order to shorten the reaction time, ionic substances in the resin are dissolved in the liquid crystal materials by the action of radicals generated from the photosensitizer, which results in lowering impedance of the liquid crystal materials and undesirably increasing consuming current of the resulting liquid crystal display device.

Photosensitizers can be divided into two groups, a radical generating type which generates radicals by decomposition by light and a hydrogen withdrawing type which generates radicals by a hydrogen withdrawing reaction. When a radical generating type photosensitizer is used, the curing reaction rate is generally fast but there is a defect in that the surface of the resin is difficult to be cured and remains sticky due to a reaction between the radicals generated and the oxygen in air. If a large amount of one kind of photosensitizer is used in order to increase the reaction rate, the resulting cured resin becomes brittle. On the other hand, when a hydrogen withdrawing type photosensitizer is used, the reaction on the surface of the resin is not retarded, but the hydrogen withdrawing type photosensitizer is generally slow in the reaction rate.

Therefore, although many photosensitizers are known in this art (e.g. Japanese Patent Appln Kokai (Laid-Open) No. 153651/79), there is scarcely known effective photosensitizers which can cure photo-setting resins uniformly both on the surface and inner portions of the sealed portion of the fill port in a very short time by exposure to light.

SUMMARY OF THE INVENTION

It is an object of this invention to provide a liquid crystal display device wherein a fill port for inserting a liquid crystal composition is sealed by using a special photo-setting resin composition which can be cured uniformly both on the surface portion and in the inner portion in a very short time.

It is another object of this invention to provide a photo-setting resin sealing medium for sealing a fill port of a liquid crystal display element.

This invention provides a liquid crystal display device comprising a pair of substrates which are placed in parallel and at least one of which is transparent, the peripheries of said substrates being sealed by a sealant to form an inner cavity with a fill port, said inner cavity being filled with a liquid crystal composition, the inner surfaces of said substrates facing each other having electrodes and orientation controlling films thereon, and said fill port being sealed by using a photo-setting resin composition comprising an acrylic or methacrylic type resin as a major resin component and two or more photosensitizers different in quality, and also provides such a photo-setting resin composition for sealing a fill port of a liquid crystal display device.

DETAILED DESCRIPTION OF THE INVENTION

Figure 1:
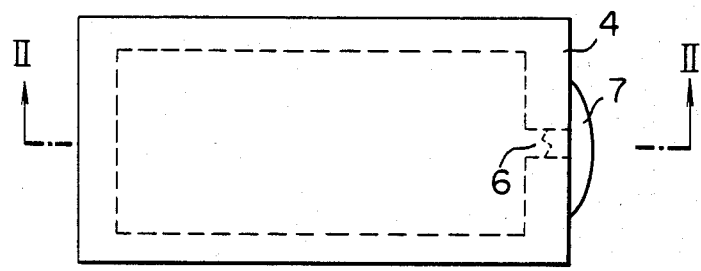
FIG. 1 is a plan view of a liquid crystal display device.
Figure 2:
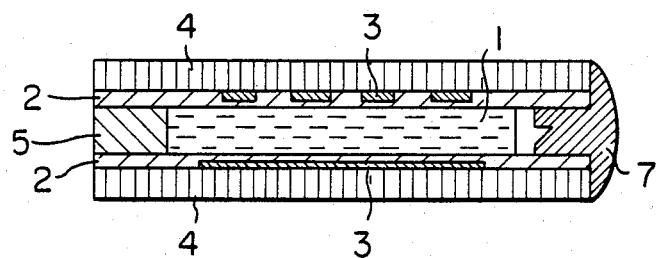
FIG. 2 is a sectional view of essential portions of a liquid crystal display device taken along the line of II–II' of FIG. 1.

Features of this invention are use of a special photo-setting resin composition for sealing the fill port of a liquid crystal display device. In this invention, any type of display device such as shown in FIGS. 1 and 2 can be used. Needless to say, various modifications can be applied to the liquid crystal display element shown in FIGS. 1 and 2.

In FIGS. 1 and 2, numeral 1 denotes liquid crystal materials inserted into the inner cavity in the form of a liquid crystal composition, numeral 2 denotes an orientation controlling film, numeral 3 denotes a transparent electrode, numeral 4 denotes a substrate which is a transparent plate such as a glass plate, numeral 5 denotes a sealant, numeral 6 denotes a fill port and numeral 7 denotes a sealing medium for the fill port. Although a polarizing plate and a reflector are not shown in the drawings in the case of a reflection type display device, this does not mean that such constituents are not necessary, and these constituents are omitted for simplification. The same thing can be applied to a transmission type display device.

The photo-setting resin composition used for sealing the fill portion comprises an acrylic or methacrylic type resin as a major resin component and two or more photosensitizers different in quality.

The acrylic or methacrylic type resin means a resin which contains one or more acryl or methacryl groups in one molecule and can be cured with a high rate by radical polymerization. Considering moisture resistance, adhesive properties, incompatibility with the liquid crystal materials, and the like, it is preferable to use resins containing polyesters, polyethers, hydrocarbons such as polyolefins, polydienes, silicones, epoxies, and the like in the molecule.

More concretely, there can be used acryl or methacryl modified polyesters such as a polyester prepared from adipic acid and ethylene glycol and having one or two acryl or methacryl groups as terminal groups; a polyethylene glycol having acryl or methacryl groups as terminal groups; a reaction product obtained by reacting a diglycidyl ether of bisphenol A with acrylic acid or methacrylic acid; diacrylate or dimethacrylate of hexanediol; a polymer obtained by adding acryl or methacryl groups to the terminal groups of a poly(1,2-butadiene; a polymer obtained by adding acryl or methacryl groups to the terminal groups of a polydimethylsiloxane.

In addition, there may also be used a compound having polyfunctional acryl or methacryl group or groups such as acrylate or methacrylate of 2-ethylhexyl alcohol, 2-hydroxypropyl acrylate or methacrylate, acrylate or methacrylate of lauryl alcohol, in order to lower the viscosity, and to adjust the heat deformation temperature so far as the properties of the resin are not lowered.

In order to improve the adhesion strength and reliability of the device, it is preferable to use an acryl or methacryl modified resin having a molecular weight of 10,000 or more.

As the photosensitizers, it is necessary to use two or more photosensitizers different in quality. As to the quality, it is preferable to employ the ability relating to curing speed. Photosensitizers usable in this invention can be divided into the following two groups:

Group (a):
  $\beta$-naphthalene sulfochloride
  1-butylnaphthalene-sulfonic acid-2-chloride
  1,4-dibutylnaphthalene-sulfonic acid-2-chloride
  p,p-ditolyl disulfide
  $\beta,\beta$-dinaphthalene disulfide
  decyl chloride
  benzoin methyl ether
  benzoin ethyl ether
  benzoin isopropyl ether
  benzoin n-butyl ether
  benzoin sec-butyl ether
  benzoin isobutyl ether
  di-tert-butyl peroxide
  2-methylanthraquinone
  1,5-dinitroanthraquinone
  anthraquinone Group (b):
  benzenesulfochloride
  diphenyl disulfide
  tetramethylthiuram disulfide
  bis(2-benzthiazyl) disulfide
  dibenzyl ketone
  Michler's ketone
  phenyl acetone
  benzophenone
  4-methoxy benzophenone
  acetophenone
  acetylacetone
  benzoin phenyl acetate
  benzoin tert-butyl ether
  furoin
  furoin methyl ether
  tert-butyl perbenzoate The group (a) includes photosensitizers which can reduce the curing reaction time greatly, while the group (b) includes photosensitizers which can reduce the curing reaction time not so greatly as the group (a). Curing speeds of these photosensitizers can be estimated by gelation time, curing time, or the like.

It is a surprising thing that uniform curing can be obtained indifferent to the surface and inner portions in a very short time by a combined use of at least one member selected from the photosensitizers belonging to the group (a) which is fast curable and at least one member selected from the photosensitizers belonging to the group (b) which is slowly curable. Such an excellent effect cannot be obtained even if only one or two photosensitizers belonging to the group (a) are used. Reasons for such effects are not clear, but it seems that one or more photosensitizers belonging to the group (a) which has higher sensitivity to light proceeds cross-linking of the resin first, and after a little while one or more photosensitizers belonging to the group (b) which has rather lower sensitivity to light proceeds further crosslinking of the resin gradually (but within a short time), so that inner strain caused by the cured resin becomes remarkably small. Another preferable combination is one or more radical generating type photosensitizers belonging to the group (a) or (b) and one or more hydrogen withdrawing type photosensitizers belonging to the group different from that mentioned above.

It is preferable to use the photosensitizers of the group (a) and those of the group (b) in a weight ratio of group (a)/group (b)=1/9 to 9/1. The photosensitizers as a total can preferably be used in an amount of 1 to 10% by weight based on the weight of the resin component.

The photo-setting resin composition may contain, if necessary, one or more additives such as adhesion improvers, fillers, etc., in order to improve properties.

Examples of the adhesion improvers are titanium series coupling agents, silane series coupling agents, polychloroprene, poly-1,4-butadiene, a copolymer of styrene and butadiene, graft copolymers of elastomers such as ethylene/propylene copolymer type elastomer and acrylic or methacrylic resin, etc.

Examples of fillers are silica, alumina, calcium carbonate, etc., which can improve coating properties of the photo-setting resin composition, adjust thermal expansion coefficients and prevent the dissolving of the resin composition in the liquid crystal materials.

The resin composition mentioned above is used for sealing a fill port for inserting a liquid crystal composition into the inner cavity of a liquid crystal display device. The fill port may be formed in one or more portions in the sealant as shown in FIG. 1 and 2, or may be formed in an upper or lower substrate. For example, in the case of a liquid crystal display device as shown in FIG. 1, after inserting a liquid crystal composition 1 into the inner cavity formed by a pair of substrates 4 having electrodes 3 and orientation controlling films 2 thereon and a sealant 5 according to a conventional process using conventional materials, areas around the fill port are cleaned by using, for example, a sheet of paper or cloth to remove liquid crystals attached thereto, and the resin composition mentioned above is coated by using, for example, a spatula, an injector or the like apparatus. Subsequently, the resin composition is cured by irradiating light. As a light source, one which can generate a large amount of visible and ultraviolet lights having a wavelength of 400 nm or less such as a mercury lamp, a xenon lamp, a metal halide lamp or the like can be used effectively. Sufficient cure of the resin composition can be obtained by irradiation using such a light source as mentioned above with energy of 4000 to 25,000 $\mu$W/cm$^2$ for about 0.5 to 3 minutes. Too long irradiation time is not preferable considering the deterioration of the liquid crystal composition. Too small absolute amount of irradiation is not preferable because of causing insufficient curing, particularly on the surface portion of the sealing medium, while too large absolute amount of irradiation is also not preferable due to giving bad influences to the resulting display device. It is generally admitted that the irradiation time of 1.5 minutes or less at an irradiation intensity of 6000 μW/cm² is preferable. According to the present invention, such a requirement can sufficiently be attained.

This invention is illustrated by way of the following Examples, in which all parts are by weight unless otherwise specified.

EXAMPLE 1

A resin composition was prepared by mixing 65 parts of diacrylate of diglycidyl ether of bisphenol F, 15 parts of butanediol dimethacrylate, 15 parts of ethylene glycol dimethacrylate, 3 parts of benzophenone (a photosensitizer belonging to the group (b)) and 2 parts of 2-methylanthraquinone (a photosensitizer belonging to the group (a)). On the other hand, biphenyl type liquid crystals were inserted into an inner cavity of a twisted nematic (TN) type liquid crystal cell for a table type computer (as shown in FIG. 1 and 2) through a fill port according to a conventional method. Then, the periphery of the fill port was cleaned by removing the liquid crystals attached thereto, followed by coating with the resin composition mentioned above. The resin composition was irradiated by using a mercury lamp with an intensity of 6000 μW/cm² for 1 minute. The resin composition was sufficiently cured.

COMPARATIVE EXAMPLE 1

A resin composition was prepared by the same manner as mentioned in Example 1 except for using 5 parts of 2-methylanthraquinone in place of 3 parts of benzophenone and 2 parts of 2-methylanthraquinone. When a fill port was sealed by using this resin composition, the surface of the sealed portion was not cured after 1 minute's curing under the same conditions as mentioned in Example 1. Stickiness of the surface portion of the sealed resin composition after irradiation became more remarkable, when the removal of the liquid crystals from the periphery of the fill port was insufficient.

COMPARATIVE EXAMPLE 2

A resin composition was prepared by the same manner as mentioned in Example 1 except for using 5 parts of benzophenone in place of 3 parts of benzophenone and 2 parts of 2-methylanthraquinone. Using this resin composition, a fill port was sealed in the same manner as described in Example 1.

The resulting liquid crystal display device and that obtained in Example 1 were subjected to a heat and moisture resistance test by placing them under such conditions as a temperature of 70° C. and a period of 500 hours, or a temperature of 70° C., a moisture of 90% RH and a period of 500 hours. After such tests, appearance of the sealed portions and a peeling-off test using an adhesive tape were carried out. As to the display device of Comparative Example 2, the sealed portion was not so changed in appearance but was easily peeled off when the peeling-off test was conducted using the adhesive tape after both the heating at 70° C. for 500 hours and the heating at 70° C. and 90% RH for 500 hours.

On the other hand, as to the display device of Example 1, the sealed portion was not changed in appearance and not peeled off after both the heating at 70° C. for 500 hours and the heating at 70° C. and 90% RH for 500 hours. Thus, the display device of Example 1 had excellent reliability.

As mentioned above, by using the special resin composition containing two or more photosensitizers different in quality for sealing the fill port, the resulting liquid crystal display device is improved not only in surface curing properties of the sealed portion of the fill port but also in reliability of the display device.

What is claimed is:

1. A liquid crystal display device comprising a pair of substrates which are placed in parallel and at least one of which is transparent, the peripheries of said substrates being sealed by a sealant to form an inner cavity with a fill port, said inner cavity being filled with a liquid crystal composition, the inner surfaces of said substrates facing each other having electrodes and orientation controlling films thereon, and said fill port being sealed by using a photo-setting resin composition comprising an acrylic or methacrylic type resin as a major resin component and two or more photosensitizers different in quality, wherein the photosensitizers different in quality are comprised of at least one first photosensitizer which can reduce the curing time of the resin composition greatly and at least one second photosensitizer which can reduce the curing time of the resin composition not so greatly as the first photosensitizer, and wherein the at least one first photosensitizer is selected from the group consisting of β-naphthalene sulfochloride, 1-butylnaphthalene-sulfonic acid-2-chloride, 1,4-dibutylnaphthalene sulfonic acid-2-chloride, p,p-ditolyl disulfide, β,β-dinaphthalene disulfide, decyl chloride, benzoin methyl ether, benzoin ethyl ether, benzoin isopropyl ether, benzoin n-butyl ether, benzoin sec-butyl ether, benzoin isobutyl ether, di-tert-butyl peroxide, 2-methylanthraquinone, 1,5-dinitroanthraquinone, and anthraquinone, and the at least one second photosensitizer is selected from the group consisting of benzene-sulfochloride, diphenyl disulfide, tetramethylthiuram disulfide, bis(2-benzthiazyl) disulfide, dibenzyl ketone, Michler's ketone, phenyl acetone, benzophenone, 4-methoxy benzophenone, acetophenone, acetylacetone, benzoin phenyl acetate, benzoin tert-butyl ether, furoin, furoin methyl ether and tert-butyl perbenzoate.

2. A liquid crystal display device according to claim 1, wherein the photosensitizers as a whole are used in an amount of 1 to 10% by weight based on the weight of the resin component.

3. A liquid crystal display device according to claim 1, wherein the photosensitizers are a combination of a hydrogen withdrawing type and a radical generating type.

4. A sealing medium for sealing a fill port for inserting a liquid crystal composition into a liquid crystal display device which comprises an acrylic or methacrylic type resin as a major resin component and two or more photosensitizers different in quality, wherein the photosensitizers different in quality are composed of at least one first photosensitizer which can reduce the curing time of the resin component and at least one second photosensitizer which can reduce the curing time of the resin component not so greatly as the first photosensitizer, and wherein the at least one first photosensitizer is selected from the group consisting of β-naphthalene sulfochloride, 1-butylnaphthalene-sulfonic acid-2-chloride, 1,4-dibutylnaphthalene sulfonic acid-2-chloride, p,p-ditolyl disulfide, β,β-dinaphthalene disulfide, decyl chloride, benzoin methyl ether, benzoin ethyl ether, benzoin isopropyl ether, benzoin n-butyl ether, benzoin sec-butyl ether, benzoin isobutyl ether, di-tert-butyl peroxide, 2-methylanthraquinone, 1,5-dinitroanthraquinone, and anthraquinone, and the at least one second photosensitizer is selected from the group consisting of benzene-sulfochloride, diphenyl disulfide, tetramethylthiuram disulfide, bis(2-benzthiazyl) disulfide, dibenzyl ketone, Michler's ketone, phenyl acetone, benzophenone, 4-methoxy benzophenone, acetophenone, acetylacetone, benzoin phenyl acetate, benzoin tert-butyl ether, furoin, furoin methyl ether and tert-butyl perbenzoate.

5. A sealing medium according to claim 4, wherein the weight ratio of said at least one first photosensitizer to said at least one second photosensitizer is in the range of 1/9 to 9/1.

6. A sealing medium according to claim 4, wherein the photosensitizers are a combination of 2-methylanthraquinone and benzophenone.

7. A sealing medium according to claim 4, wherein the photosensitizers are used in an amount of 1 to 10% by weight based on the weight of the resin component.

8. A sealing medium according to claim 4, wherein the photosensitizers are a combination of a hydrogen withdrawing type and a radical generating type.

9. A sealing medium according to claim 4, wherein the resin has a molecular weight of at least 10,000.

10. A liquid crystal display device comprising a pair of substrates which are placed in parallel and at least one of which is transparent, the peripheries of said substrates being sealed by a sealant to form an inner cavity with a fill port, said inner cavity being filled with a liquid crystal composition, the inner surfaces of said substrates facing each other having electrodes and orientation controlling films thereon, and said fill port being sealed by using a photo-setting resin composition comprising an acrylic or methacrylic type resin as a major resin component and two or more photosensitizers different in quality, wherein the photosensitizers different in quality are comprised of at least one first photosensitizer which can reduce the curing time of the resin composition greatly and at least one second photosensitizer which can reduce the curing time of the resin composition not so greatly as the first photosensitizer, and wherein the photosensitizers are a combination of 2-methylanthraquinone and benzophenone.

* * * * *